United States Patent
Sakai et al.

(10) Patent No.: US 6,969,963 B2
(45) Date of Patent: Nov. 29, 2005

(54) PWM CONTROLLED MOTOR DRIVE

(75) Inventors: Hirofumi Sakai, Kyoto (JP); Tomoharu Yokouchi, Osaka (JP); Ken Maruyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 116 days.

(21) Appl. No.: 10/737,832

(22) Filed: Dec. 18, 2003

(65) Prior Publication Data

US 2004/0245948 A1 Dec. 9, 2004

(30) Foreign Application Priority Data

Jun. 3, 2003 (JP) ........................................ 2003-158035

(51) Int. Cl.⁷ ............................ G05B 11/28; H02P 3/08; H02P 5/06
(52) U.S. Cl. ........................ 318/439; 318/254; 318/138; 318/801; 318/803; 318/804; 318/805; 318/806; 318/807; 318/808; 318/809; 318/810; 318/811; 318/599
(58) Field of Search ................................ 318/254, 138, 318/139, 439, 801–11, 599

(56) References Cited

U.S. PATENT DOCUMENTS

| | | | | |
|---|---|---|---|---|
| 5,506,487 A | * | 4/1996 | Young et al. | 318/811 |
| 5,612,599 A | * | 3/1997 | Itami et al. | 318/254 |
| 5,640,073 A | * | 6/1997 | Ikeda et al. | 318/439 |
| 5,821,708 A | * | 10/1998 | Williams et al. | 318/254 |
| 5,942,876 A | * | 8/1999 | Maekawa | 318/801 |
| 6,380,707 B1 | * | 4/2002 | Rosholm et al. | 318/439 |
| 6,512,342 B2 | * | 1/2003 | Kawagoshi | 318/254 |
| 6,674,258 B2 | * | 1/2004 | Sakai et al. | 318/439 |
| 6,806,663 B2 | * | 10/2004 | Kusaka et al. | 318/254 |
| 2002/0097014 A1 | * | 7/2002 | Kawagoshi | |

FOREIGN PATENT DOCUMENTS

JP 2003-79182 A 3/2003

* cited by examiner

Primary Examiner—David Martin
Assistant Examiner—Elias Hiruy
(74) Attorney, Agent, or Firm—McDermott, Will & Emery; Jack Q. Lever, Jr.

(57) ABSTRACT

The motor driver having a plurality of output circuits each having two switching elements connected in series includes: a phase switch circuit for putting a switching element on one side of one output circuit among the plurality of output circuits in the ON state during a time period corresponding to a predetermined electrical angle, and performing switching operation for switching elements on the other side of plural output circuits among the remaining output circuits; and a conduction period control section. The conduction period control section generates a signal for controlling the switching operation. Specifically, when the number of times of switching operation performed during the time period corresponding to the predetermined electrical angle is equal to or less than a predetermined value, a switching element corresponding to a phase, for which the magnitude of the current should be decreased, is turned OFF in the time period corresponding to the next predetermined electrical angle.

3 Claims, 12 Drawing Sheets

PWM CONTROLLED MOTOR DRIVE

BACKGROUND OF THE INVENTION

The present invention relates to motor drive technology, and more particularly, to a motor drive technology of a pulse width modulation (PWM) system.

Figure 2:
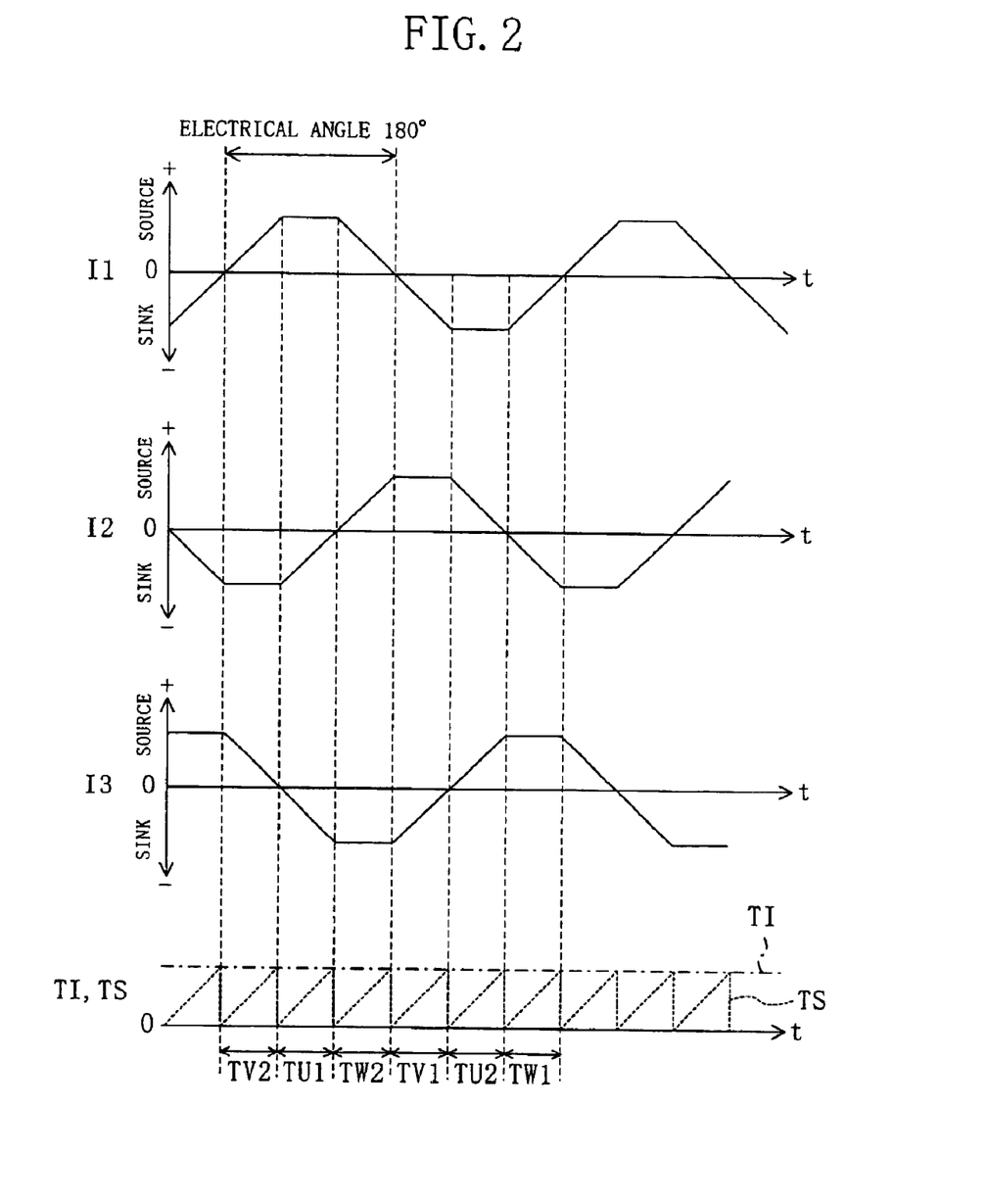
FIG. 2 is a graph showing target waveforms of respective phase currents for the motor, together with signals used for control of the currents.
Figure 9:
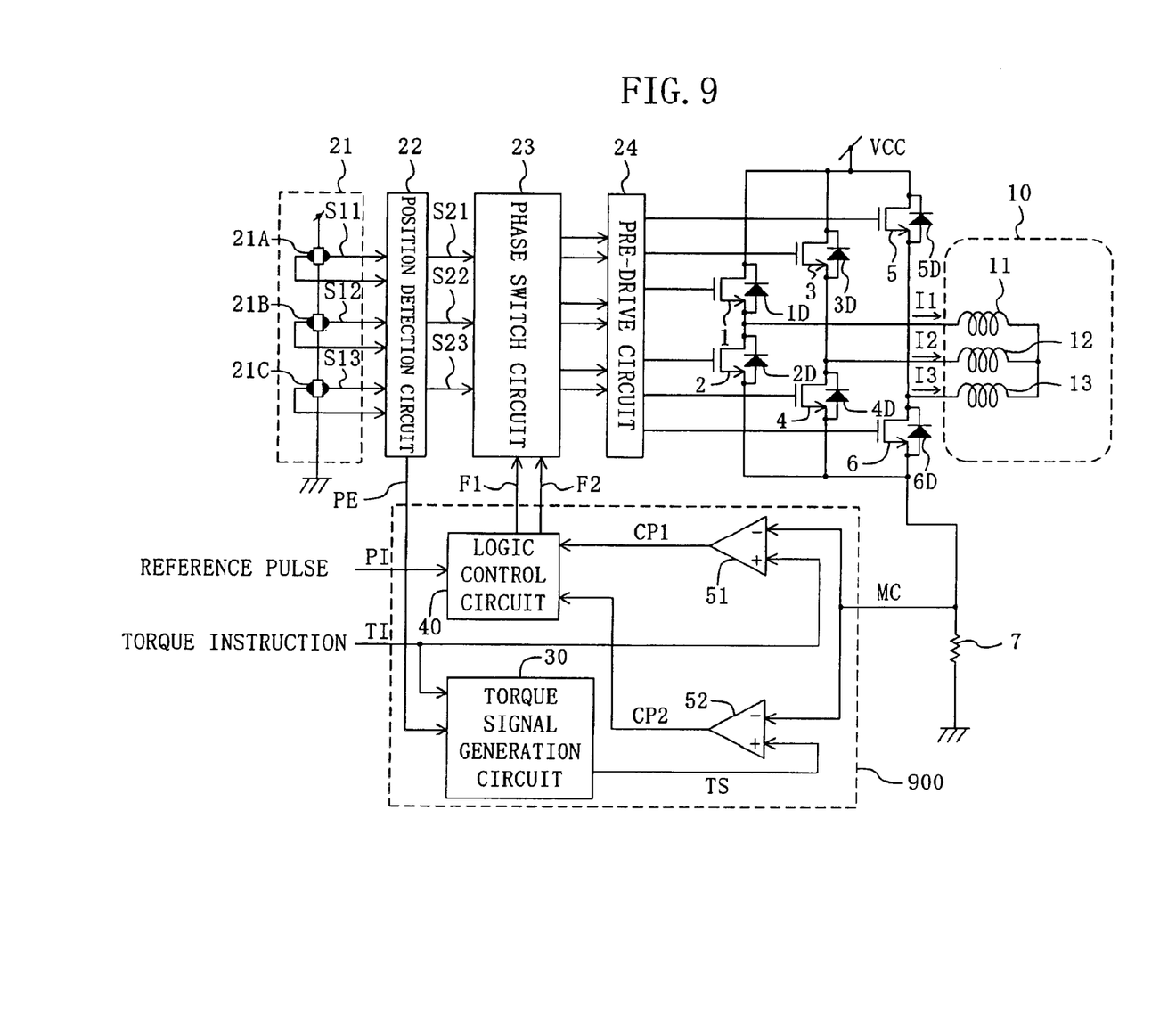
FIG. 9 is a block diagram of a conventional motor driver and a motor driven with the motor driver.

FIG. 9 is a block diagram of a conventional motor driver and a motor driven with the motor driver. FIG. 2 is a graph showing target waveforms of phase currents for a motor 10. A position detection circuit 22 outputs signals corresponding to the position of a rotor of the motor 10 based on outputs of a Hall sensor circuit 21. A torque signal generation circuit 30 generates a signal TS of a sawtooth wave having a peak value corresponding to a torque instruction voltage TI and a period equal to the time period corresponding to an electrical angle of 60° of the motor 10. A logic control circuit 40 generates switching operation control signals F1 and F2 for defining the time period during which drive transistors 1 to 6 are put in the ON state. A phase switch circuit 23 turns ON the drive transistors 1 to 6 according to the signals output from the position detection circuit 22 and the switching operation control signals F1 and F2.

Figure 10:
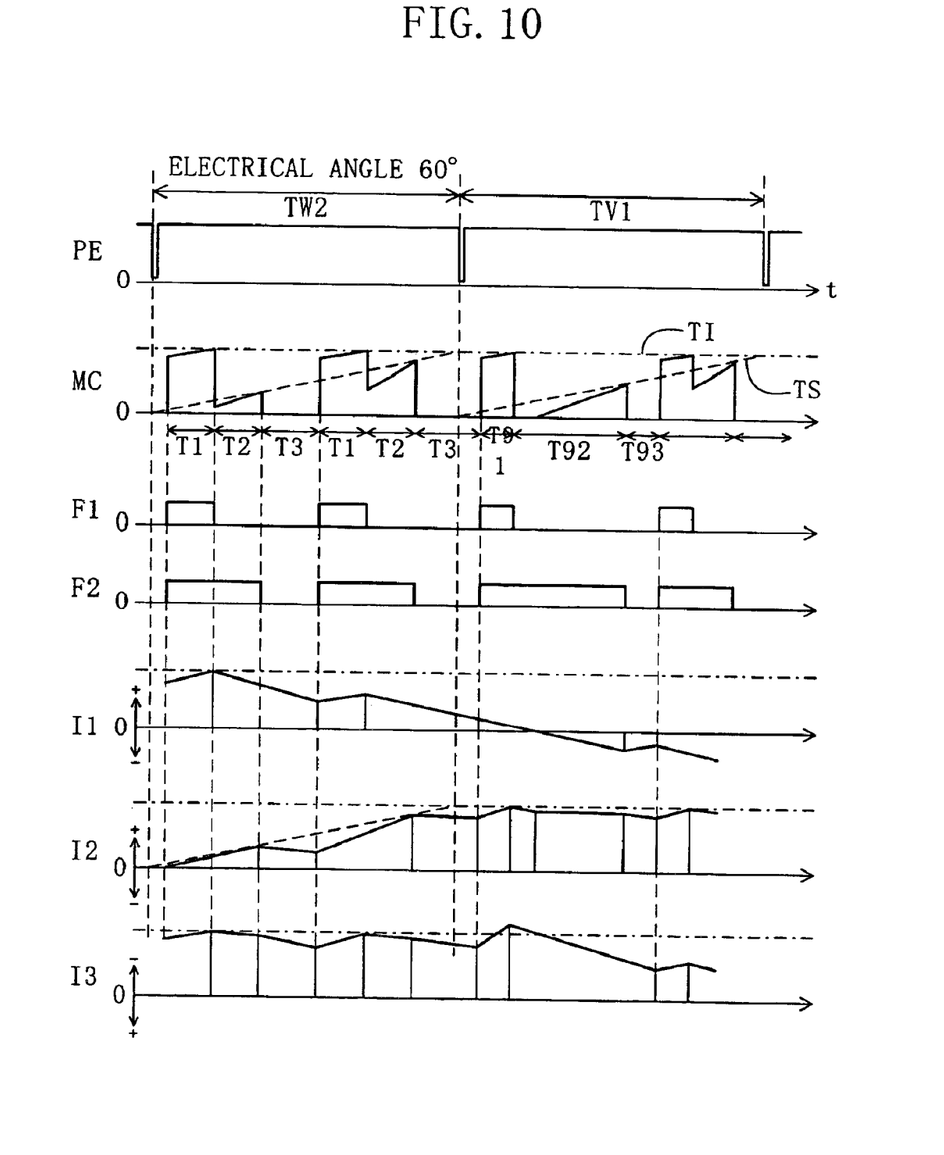
FIG. 10 is a graph showing phase currents for the motor driven with the motor driver of FIG. 9 and other signals.

FIG. 10 is a graph showing phase currents for the motor 10 driven with the motor driver of FIG. 9 and other signals, in which periods TW2 and TV1 in FIG. 2 are shown in detail in an enlarged view. First, the period TW2 will be described.

With input of a reference pulse PI, two flipflops of the logic control circuit 40 are set, and the phase switch circuit 23 turns ON a U-phase upper arm side drive transistor 1, a V-phase upper arm side drive transistor 3 and a W-phase lower arm side drive transistor 6, for example (period T1). At this time, the sum of a U-phase current I1 flowing through a U-phase coil 11 and a V-phase current I2 flowing through a V-phase coil I2, that is, the magnitude of a W-phase current 13 flowing through a W-phase coil I3 can be detected with a current detection resistance 7. Flowing through the coil load, the current gradually increases with conduction of the drive transistors 1, 3 and 6. Once the voltage generated at the current detection resistance 7 reaches the torque instruction voltage TI with increase of the current flowing through this resistance, one of the flipflops of the logic control circuit 40 is reset with the output of a comparator 51, and this turns OFF only the drive transistor 1.

The drive transistors 3 and 6 are kept in the ON state. At this time, therefore, the magnitude of the current flowing through the V-phase coil 12 and the W-phase coil 13 can be detected with the current detection resistance 7. The current flowing through the V-phase coil 12 and the W-phase coil 13 continue increasing, and once the voltage generated at the current detection resistance 7 reaches the signal TS output from the torque signal generation circuit 30, the other flipflop of the logic control circuit 40 is reset with the output of a comparator 52, and this turns OFF the drive transistor 3.

The time period from the setting of a flipflop of the logic control circuit 40 until the reset thereof is an ON period of switching operation. After the reset of the flipflop, the currents flowing through the U-phase, V-phase and W-phase coils 11, 12 and 13 become regenerative currents passing through diodes existing between the source and drain of the drive transistors 2 and 4 in an attempt of maintaining the flowing state.

Since the regenerative currents do not pass through the current detection resistance 7, the voltage generated at the current detection resistance 7 is equal to a voltage generated with the V-phase current I2 during flow of a U-phase regenerative current (period T2), and it is zero during flow of U-phase and V-phase regenerative currents (period T3). The regenerative current gradually decreases. When the reference pulse PI is input again, the flipflops of the logic control circuit 40 are set. The drive transistors 1 and 3 are turned ON, and the operation described above is repeated.

Figure 11:
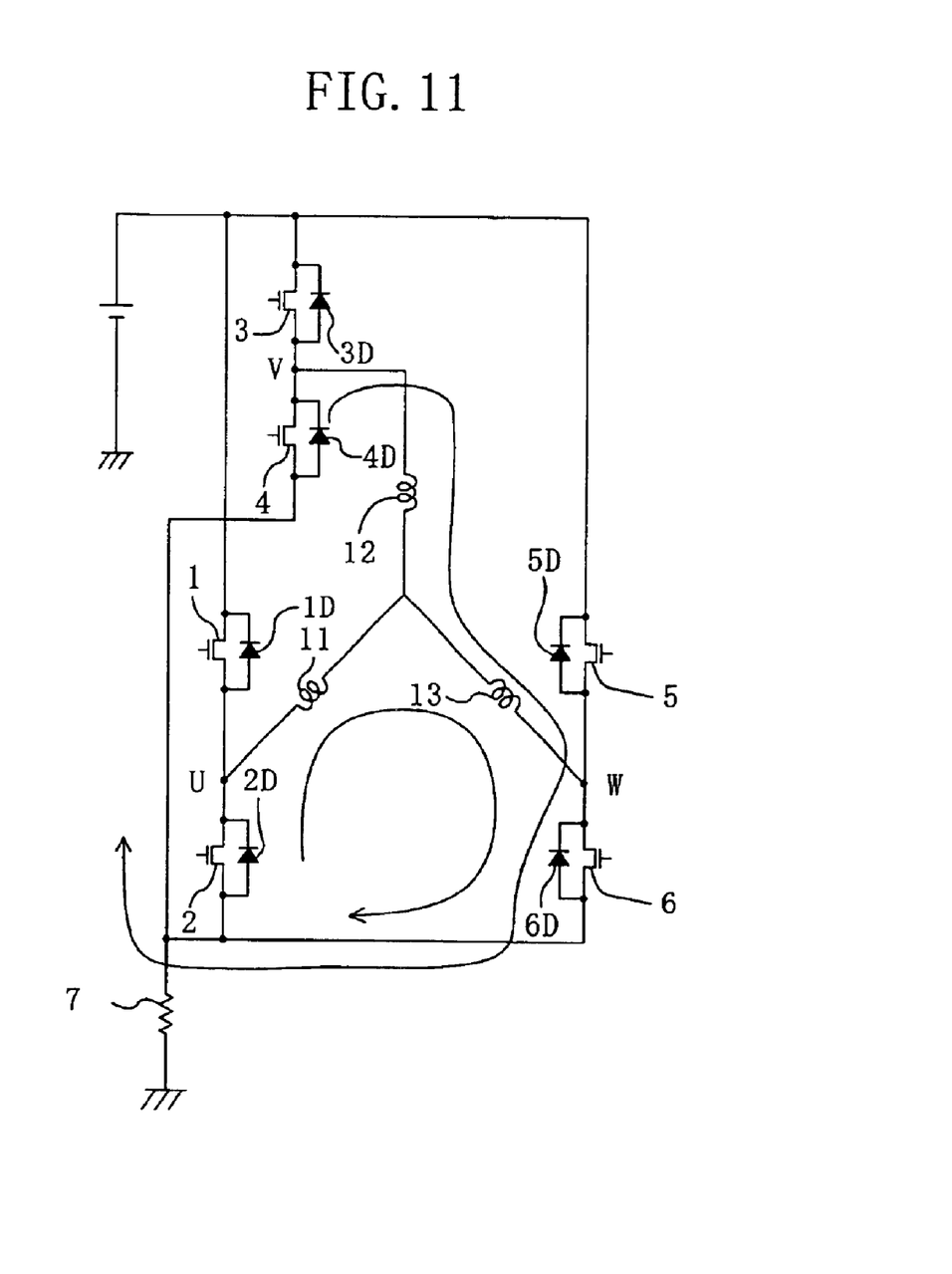
FIG. 11 is an illustration of routes of currents during a period T3 in FIG. 10.

FIG. 11 is an illustration of routes of currents during the period T3 in FIG. 10.

Referring to FIG. 11, the U-phase current I1 flows through a diode 2D, the U-phase coil 11, the W-phase coil 13 and the W-phase lower arm side transistor 6 as a regenerative current, and the V-phase current I2 flows through a diode 4D, the V-phase coil 12, the W-phase coil 13 and the W-phase lower arm side transistor 6 as a regenerative current.

As a result of the alternate flow of a drive current and a regenerative current by the switching described above, a motor phase current of a trapezoidal wave as shown in FIG. 2 having a peak value corresponding to the torque instruction voltage TI is allowed to flow to a predetermined coil load in synchronization with the output of the position detection circuit 22. Such a motor driver as that described above is disclosed in Japanese Laid-Open Patent Publication No. 2003-79182, for example.

Figure 12:
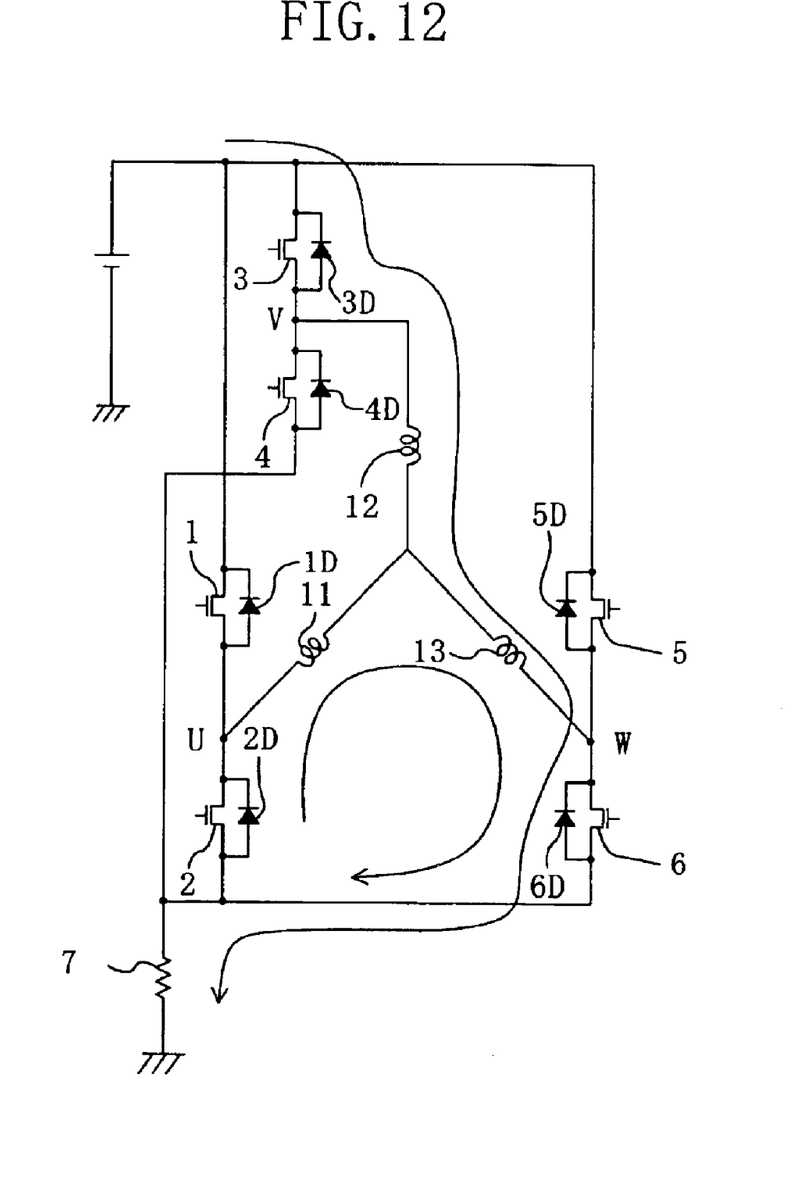
FIG. 12 is an illustration of routes of currents during a period T91 in FIG. 10.

The operation of the motor driver of FIG. 9 during the period TV1 in FIG. 10 will then be described. FIG. 12 is an illustration of routes of currents during a period T91 shown in FIG. 10. In the period T91, the V-phase current I2 flows through the V-phase upper arm side transistor 3, the V-phase coil 12, the W-phase coil 13, the W-phase lower arm side transistor 6 and the current detection resistance 7. If the U-phase current I1 has not sufficiently decreased by the start of the period T91, the U-phase current I1 continues flowing as a regenerative current through the U-phase lower arm side transistor 2, the U-phase coil 11, the W-phase coil 13 and the W-phase lower arm side transistor 6 even after conduction of the transistor 2.

In the case described above, both the V-phase current I2 and the U-phase current I1 flowing as a regenerative current flow through the W-phase coil 13. Because a regenerative current does not flow through the current detection resistance 7, only the V-phase current I2 flows through the current detection resistance 7 and increases to reach a target current of the magnitude corresponding to the torque instruction voltage TI, until the regenerative current becomes zero. As a result, a current greater than the current determined by the torque instruction voltage TI by the magnitude of the regenerative current will flow through the W-phase coil 13.

As described above, in the motor driver of FIG. 9, in the case that the load of the motor is large, for example, the current of a phase for which the current should be increased finds difficulty in increasing, while the current of a phase for which the current should be decreased finds difficulty in decreasing, due to influence of an induced voltage and the like. Also, when the time period corresponding to the electrical angle 60° is short, as during high-speed rotation of a motor, the ratio of the switching period to this time period is great.

As a result, the phase of the phase current supplied to the motor delays with respect to a position signal PS indicating the position of the rotor, causing a problem that the current of a phase for which the current should be decreased fails to decrease to zero within the time period corresponding to the electrical angle 60°. This disadvantageously generates brake torque on the motor and thus degrades the efficiency of the motor.

Moreover, if the current of a phase for which the current should be decreased fails to decrease to zero within the time period corresponding to the electrical angle 60°, a phase current greater than the current determined by the torque instruction voltage TI will flow for a certain duration during the time period corresponding to the next electrical angle 60°. This may result in any of the drive transistors 1 to 6 receiving flow of a current of a magnitude exceeding its absolute maximum rating.

SUMMARY OF THE INVENTION

An object of the present invention is providing a PWM controlled motor driver capable of operating a motor stably without occurrence of breakdown of a switching element or degradation of the efficiency of the motor even when the phase of a current supplied to the motor tends to delay such as during high-speed rotation of the motor.

Specifically, the present invention is directed to a motor driver having a plurality of output circuits each having an upper arm side switching element and a lower arm side switching element connected in series. A current is supplied to a motor from a connected point between the upper arm side switching element and the lower arm side switching element of each of the output circuits. The motor driver of the invention includes: a current detection resistance connected in series with the plurality of output circuits in common for detecting a current supplied to the plurality of output circuits; a position detection section for outputting a position signal corresponding to the position of a rotor of the motor; a phase switch circuit for selecting one switching element of one output circuit among the plurality of output circuits according to the position signal and putting the selected switching element in the ON state during a time period corresponding to a predetermined electrical angle, the phase switch circuit also performing switching operation for lower arm side switching elements of plural output circuits among the remainder of the plurality of output circuits when the selected switching element is an upper arm side switching element, or performing switching operation for upper arm side switching elements of plural output circuits among the remainder of the plurality of output circuits when the selected switching element is a lower arm side switching element; and a conduction period control section for generating a switching operation control signal for controlling the switching operation by the phase switch circuit according to an input torque instruction signal and a voltage generated at the current detection resistance so that each of a plurality of time periods obtained by dividing the time period corresponding to the predetermined electrical angle has a first time period in which a plurality of switching elements among the switching elements subjected to the switching operation are put in the ON state and a second time period in which one of the plurality of switching elements put in the ON state during the first time period is kept in the ON state, and outputting the switching operation control signal, wherein the conduction period control section generates the switching operation control signal so that when the number of times of switching operation performed during the time period corresponding to the predetermined electrical angle is equal to or less than a predetermined value, a switching element corresponding to a phase for which the magnitude of a current should be decreased is turned OFF in the time period corresponding to the next predetermined electrical angle.

According to the invention described above, PWM control for suppressing sharp abnormal increase of a phase current can be provided. In particular, when the number of times of switching operation performed for a switching element decreases during a time period corresponding to a predetermined electrical angle due to delay of the phase of a current supplied to the motor with respect to a position signal indicating the position of a rotor of the motor, a switching element for a phase for which the magnitude of the current should be decreased is turned OFF in the time period corresponding to the next predetermined electrical angle. This prevents a switching element from receiving a current of a magnitude exceeding its absolute maximum rating.

In the motor driver described above, preferably, the conduction period control section includes a switching frequency monitor circuit for counting the number of times of switching operation for any of the switching elements subjected to the switching operation and outputting a signal indicating whether or not the counted number of times is equal to or less than a predetermined value.

According to the invention described above, the switching frequency monitor circuit can detect whether or not the number of times of switching operation performed for a switching element during a time period corresponding to a predetermined electrical angle is equal to or less than a predetermined value.

In the motor driver described above, preferably, the conduction period control section generates the switching operation control signal so that when the number of times of switching operation performed during the time period corresponding to the predetermined electrical angle exceeds the predetermined value again, even a switching element corresponding to a phase for which the magnitude of a current should be decreased is subjected to switching operation during the time period corresponding to the next predetermined electrical angle.

According to the invention described above, when the number of times of switching operation for a switching element increases again during a time period corresponding to a predetermined electrical angle, switching operation for a switching element for a phase for which the magnitude of a current should be decreased is restarted. This enables restart of the PWM control for suppressing sharp change of a phase current without stopping the motor.

DESCRIPTION OF THE PREFERRED EMBODIMENTS

Hereinafter, a preferred embodiment of the present invention will be described with reference to the accompanying drawings. In the embodiment to follow, the case that a motor driver drives a 3-phase brushless motor will be described as an example.

Figure 1:
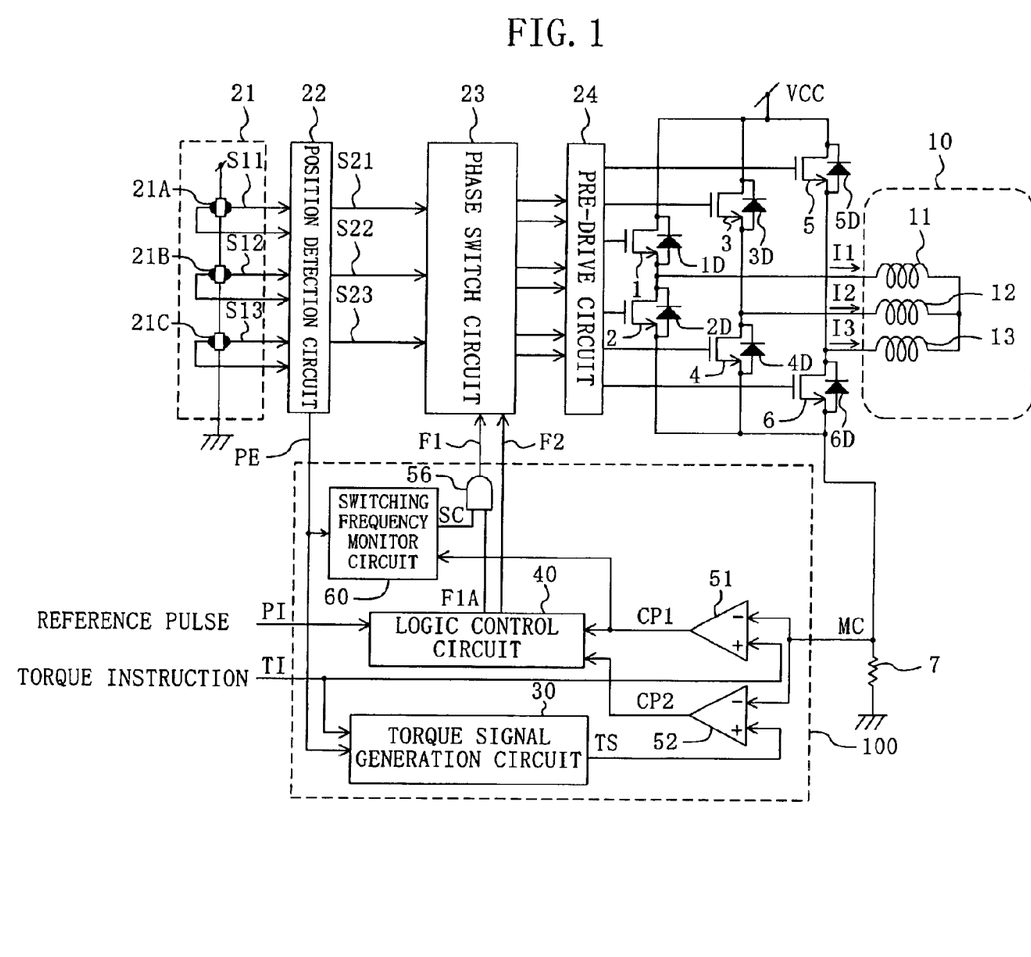
FIG. 1 is a block diagram of a motor driver of an embodiment of the present invention and a motor driven with the motor driver.

FIG. 1 is a block diagram of a motor driver of an embodiment of the present invention and a motor driven with the motor driver. The motor driver of FIG. 1 includes U-phase, V-phase and W-phase upper arm side drive transistors 1, 3 and 5, U-phase, V-phase and W-phase lower arm side drive transistors 2, 4 and 6, diodes 1D, 2D, 3D, 4D, 5D and 6D, a current detection resistance 7, a Hall sensor circuit 21, a position detection circuit 22, a phase switch circuit 23, a pre-drive circuit 24 and an conduction period control section 100.

The conduction period control section 100 includes a torque signal generation circuit 30, a logic control circuit 40, comparators 51 and 52, an AND gate 56 and a switching frequency monitor circuit 60. A motor 10 includes a U-phase coil 11, a V-phase coil 12 and a W-phase coil 13. The Hall sensor circuit 21 and the position detection circuit 22 constitute a position detection section.

N-type metal oxide semiconductor (MOS) transistors are used as the drive transistors 1 to 6 in this embodiment. The anode and cathode of the diode 1D are connected to the source and drain of the drive transistor 1, respectively. Likewise, the diodes 2D to 6D are connected to the drive transistors 2 to 6, respectively, in the same manner. The drains of the drive transistors 1, 3 and 5 are connected to the power supply VCC, and the sources of the drive transistors 2, 4 and 6 are connected to one terminal of the current detection resistance 7. The other terminal of the current detection resistance 7 is grounded. The drive transistors 1 to 6 operate as switching elements.

The drive transistors 1 and 2 and the diodes 1D and 2D constitute a U-phase output circuit. The drive transistors 3 and 4 and the diodes 3D and 4D constitute a V-phase output circuit. The drive transistors 5 and 6 and the diodes 5D and 6D constitute a W-phase output circuit. The current detection resistance 7 can detect the sum of currents supplied to these output circuits.

The motor driver of FIG. 1 includes the diodes 1D to 6D. Alternatively, parasitic diodes of the drive transistors 1 to 6 may be used as the diodes 1D to 6D. In other words, a diode may structurally exist in each of the drive transistors 1 to 6.

The source of the drive transistor 1 is connected to the drain of the drive transistor 2 and also connected to one terminal of the U-phase coil 11 of the motor 10. The source of the drive transistor 3 is connected to the drain of the drive transistor 4 and also connected to one terminal of the V-phase coil 12 of the motor 10. The source of the drive transistor 5 is connected to the drain of the drive transistor 6 and also connected to one terminal of the W-phase coil 13 of the motor 10. The other terminals of the U-phase coil 11, the V-phase coil 12 and the W-phase coil 13 are connected to one another.

Herein, a current flowing from the drive transistors 1 and 2 to the U-phase coil 11 is called a U-phase current I1. Likewise, a current flowing from the drive transistors 3 and 4 to the V-phase coil 12 is called a V-phase current I2, and a current flowing from the drive transistors 5 and 6 to the W-phase coil 13 is called a W-phase current I3. Also, currents flowing from the drive transistors 1 to 6 toward the coils 11 to 13 are called source currents, while currents flowing in the opposite direction are called sink currents. The direction of the source currents is assumed as the positive direction for all the phase currents. The coils 11 to 13 of the motor 10 are in Y connection. Therefore, the respective phase currents are equal to currents flowing through the corresponding coils.

FIG. 2 is a graph showing target waveforms of the phase currents I1 to I3 for the motor 10 and signals TI and TS used for control of the currents. The motor driver of FIG. 1 controls supply of currents to the motor 10 in a manner as shown in FIG. 2 so that the phase currents I1 to I3 for the motor 10 have no sharp change. The motor driver of FIG. 1 divides the electrical angle 180° of the motor 10 into three, for example, and switches the conduction phase every time period corresponding to the divided electrical angle, that is, every rotation of a rotor of the motor 10 by an angle corresponding to the divided electrical angle, to control the currents for the motor 10.

For example, a period TU1 in FIG. 2 is a time period corresponding to the electrical angle 60°. During the period TU1, the U-phase current I1 is a source current having a roughly constant magnitude. The V-phase current I2 is a sink current of which the magnitude has a tendency of gradually decreasing with time t. The W-phase current I3 is a sink current of which the magnitude has a tendency of gradually increasing from 0 with time t. To attain this state, during the period TU1, control is performed as follows. The U-phase upper arm side drive transistor 1 is continuously put in the ON state. Switching operation is performed for the V-phase and W-phase lower arm side drive transistors 4 and 6 and thus the ON and OFF periods of the drive transistors 4 and 6 are controlled so that the V-phase current I2 and the W-phase current I3 behave as shown in FIG. 2.

Figure 3:
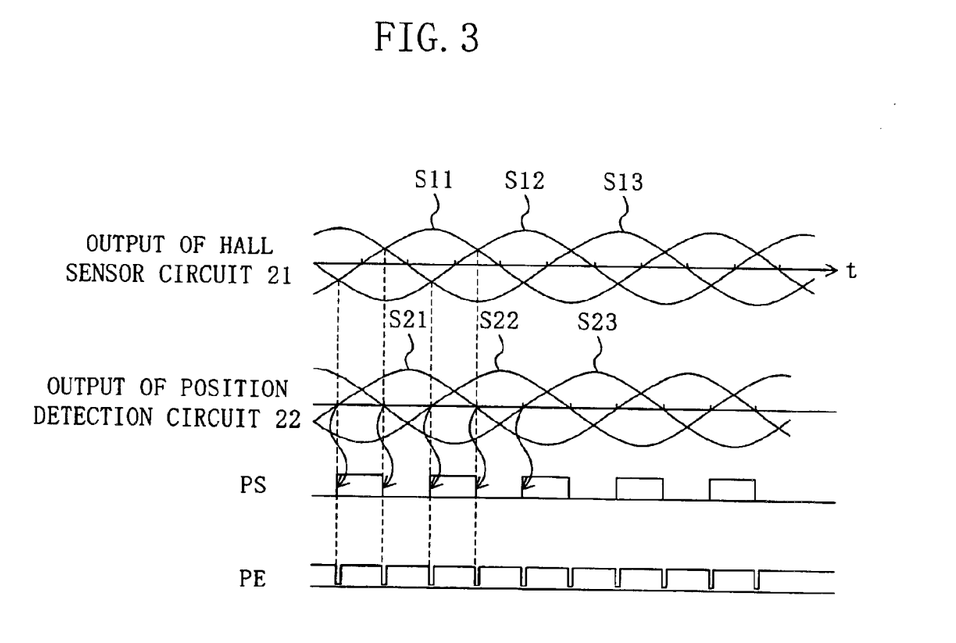
FIG. 3 is a graph showing signals related to a position detection circuit and a torque signal generation circuit in FIG. 1.

FIG. 3 is a graph showing signals related to the position detection circuit 22 and the torque signal generation circuit 30. The Hall sensor circuit 21 includes Hall sensors 21A, 21B and 21C, which detect the position of the rotor of the motor 10 and output the detection results to the position detection circuit 22 as Hall sensor outputs S11, S12 and S13, respectively. The position detection circuit 22 determines position signals S21, S22, S23 and PS based on the Hall sensor outputs S11, S12 and S13.

Specifically, the position detection circuit 22 determines the position signal S21 indicating the position of the rotor of the motor 10 based on the Hall sensor outputs S11 and S12. Herein, assume that the position signal S21 represents the difference between the Hall sensor outputs S11 and S12 (S21=S11−S12). The Hall sensor outputs S11 and S12 are approximate sine waves. When the phase of the Hall sensor output S11 is ahead of that of the Hall sensor output S12 by 120°, the phase of the position signal S21 is ahead of that of the Hall sensor output S11 by 30°. Likewise, the position detection circuit 22 determines the position signals S22 and S23 from S22=S12−S13 and S23=S13−S11, for example.

The position detection circuit 22 determines the position signal PS based on the determined position signals S21, S22 and S23. The position signal PS is a signal having a pulse rising when the position signal S21 changes from negative to positive and falling when the position signal S23 changes from positive to negative, a pulse rising when the position signal S22 changes from negative to positive and falling when the position signal S21 changes from positive to negative, and a pulse rising when the position signal S23 changes from negative to positive and falling when the position signal S22 changes from positive to negative, repeatedly.

The position detection circuit 22 also determines a position signal PE that gives pulses indicating the timing of the edges of the position signal PS. As shown in FIG. 3, the position signal PE indicates the timing at which the waveforms of the Hall sensor outputs S1, S12 and S13 cross with each other. The position detection circuit 22 outputs the position signals S21, S22 and S23 to the phase switch circuit 23, and outputs the position signal PE to the torque signal generation circuit 30 and the switching frequency monitor circuit 60.

The torque signal generation circuit 30 generates a voltage signal TS corresponding to a target value of a current flowing through the current detection resistance 7 based on the position signal PE and the torque instruction voltage (torque instruction signal) TI, and outputs the voltage signal TS to the positive input terminal of the comparator 52. As shown in FIG. 2, the signal TS is a sawtooth wave signal repeating a period of being reset to 0 with a pulse of the position signal PE, gradually increasing with time and being reset to 0 again once reaching the torque instruction voltage TI at the next pulse of the position signal PE. The period of the signal TS is equal to the period of the position signal PE, that is, the time period corresponding to the electrical angle 60° of the motor 10.

The negative input terminal of the comparator 52 receives a voltage generated at the current detection resistance 7 (source potential at the drive transistors 2, 4 and 6) as a motor current detection signal MC. The positive and negative input terminals of the comparator 51 receive the torque instruction voltage TI from outside the motor driver and the motor current detection signal MC, respectively. The comparators 51 and 52 supply respective output signals CP1 and CP2 to the logic control circuit 40.

Figure 4:
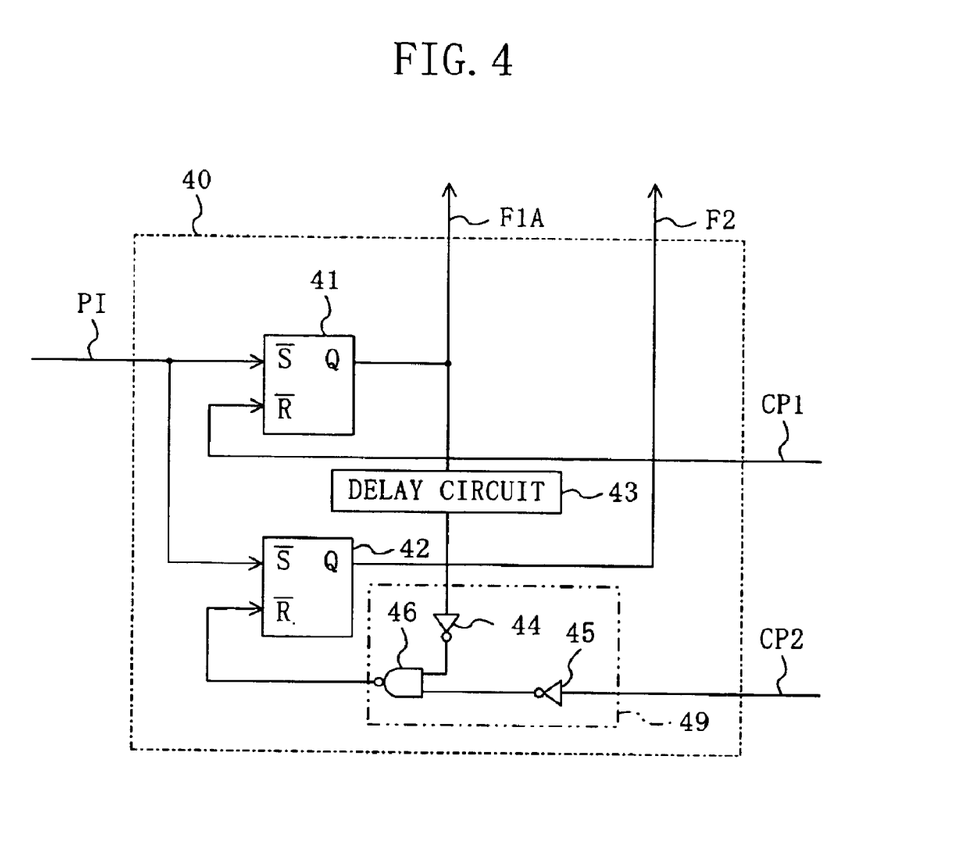
FIG. 4 is a circuit diagram showing a configuration of a logic control circuit in FIG. 1.

FIG. 4 is a circuit diagram showing a configuration of the logic control circuit 40 in FIG. 1. The logic control circuit 40 includes RS flipflops 41 and 42, a delay circuit 43, inverters 44 and 45 and a NAND gate 46. The inverters 44 and 45 and the NAND gate 46 constitute a logic circuit 49.

The logic control circuit 40 receives a reference pulse PI from outside the motor driver, in addition to the signals CP1 and CP2. The logic control circuit 40 generates switching operation control signals F1A and F2 for defining the time period during which any of the drive transistors 1 to 6 subjected to switching operation is put in the ON state, and outputs the signals F1A and F2 to the AND gate 56 and the phase switch circuit 23, respectively.

Figure 5:
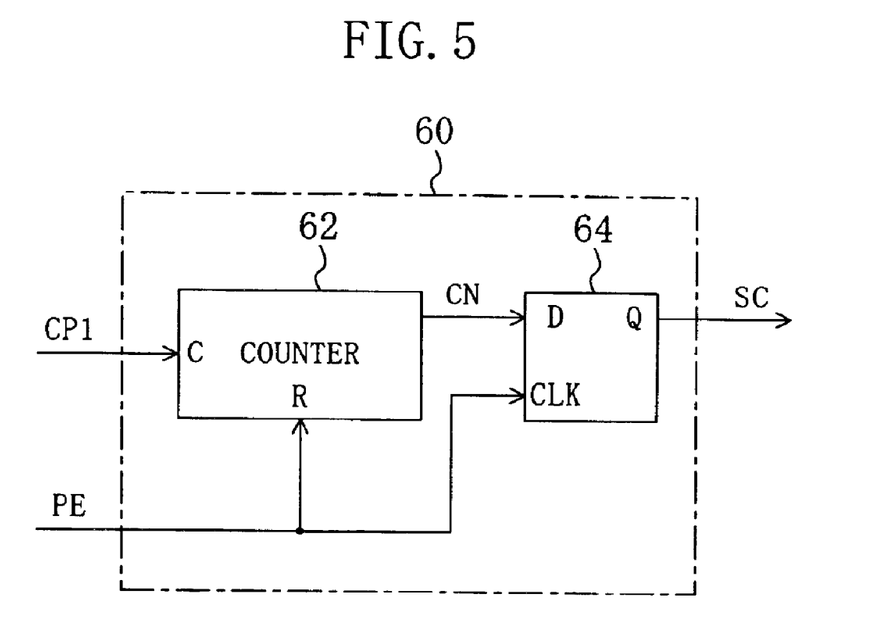
FIG. 5 is a circuit diagram showing a configuration of a switching frequency monitor circuit in FIG. 1.
Figure 6:
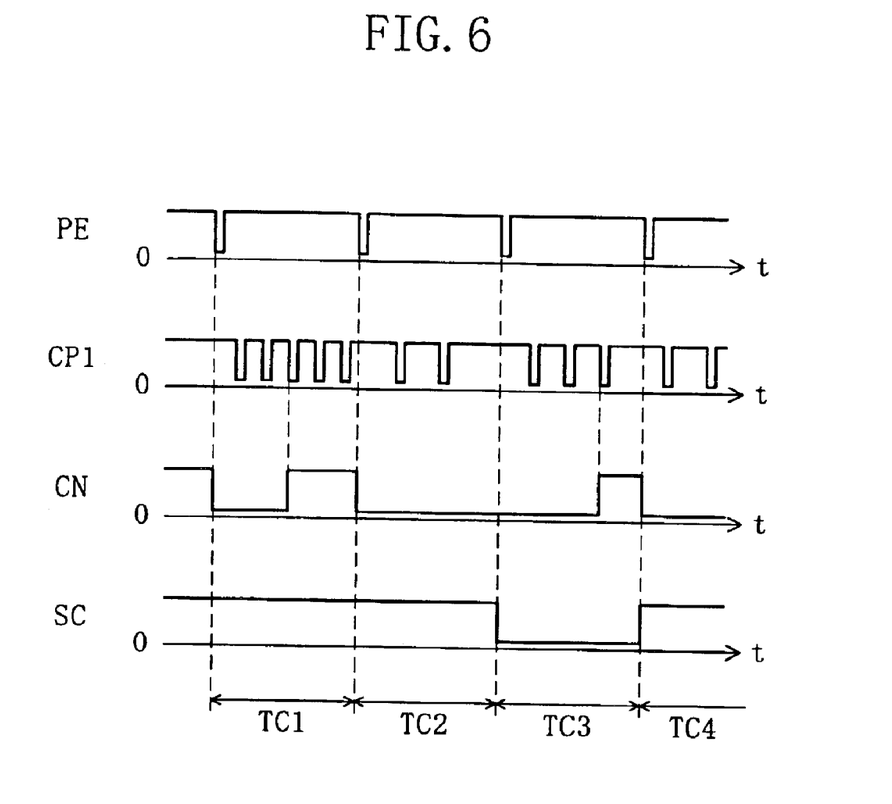
FIG. 6 is a graph showing examples of input/output signals for the switching frequency monitor circuit.

FIG. 5 is a circuit diagram showing a configuration of the switching frequency monitor circuit 60 in FIG. 1. The switching frequency monitor circuit 60 includes a counter 62 and a D flipflop 64. FIG. 6 is a graph showing examples of input/output signals for the switching frequency monitor circuit 60.

Referring to FIGS. 5 and 6, the counter 62 resets its count value once receiving a pulse of the position signal PE and turns its output CN to the D flipflop 64 to "L". The counter 62 counts the number of times of change of the output signal CP1 of the comparator 51 from "H" to "L", and turns the output CN to "H" once the count value reaches a predetermined number (for example, "3"). The D flipflop 64 outputs the immediately-preceding output CN of the counter 62 as a switching stop signal SC once receiving a pulse of the position signal PE. Note herein that "H" and "L" represent logical high and low potentials, respectively.

That is, the switching frequency monitor circuit 60 counts the number of times by which the comparator 51 changes its output to "L" during a time period corresponding to a predetermined electrical angle (for example, 60°) (time period from a pulse of the position signal PE until the next pulse thereof). When the counted number of times reaches a predetermined number (for example, three), the switching stop signal SC is "H" during the time period corresponding to the next predetermined electrical angle (periods TC2 and TC4 in FIG. 6). When it does not reach the predetermined number, the switching stop signal SC is "L" during the next time period (period TC3 in FIG. 6). Such a switching stop signal SC is output to the AND gate 56.

The AND gate 56 outputs the switching operation control signal F1A as it is to the phase switch circuit 23 as a switching operation control signal F1 when the switching stop signal SC is "H". When the switching stop signal SC is "L", the switching operation control signal F1 is turned to "L".

The phase switch circuit 23 selects any of the drive transistors 1 to 6 to be turned ON based on the position signals S21, S22 and S23 and the control signals F1 and F2, and instructs the pre-drive circuit 24 to turn ON the selected drive transistor. The pre-drive circuit 24 outputs signals to the gates of the drive transistors 1 to 6 according to the outputs of the phase switch circuit 23, to control ON/OFF of the drive transistors 1 to 6.

Figure 7:
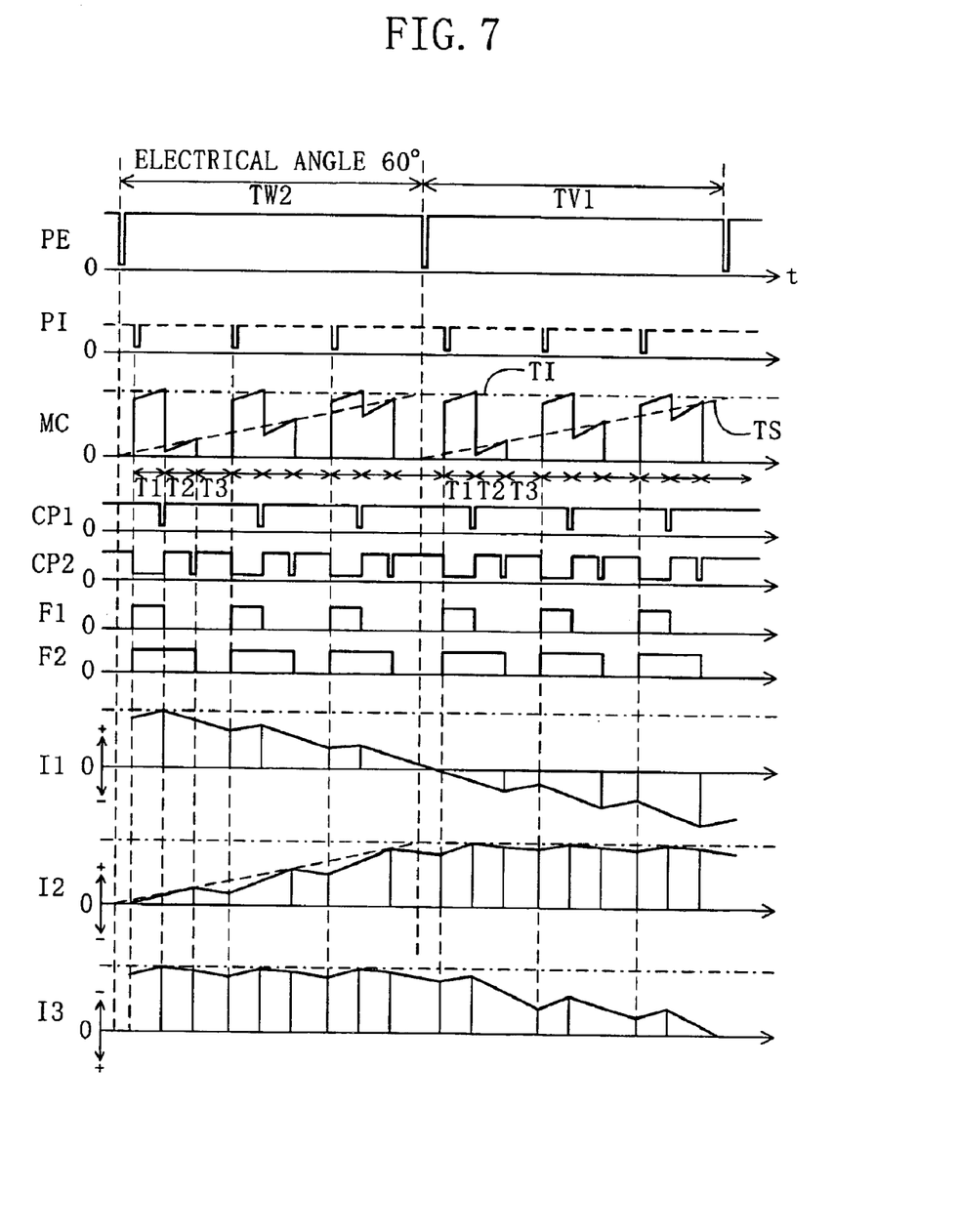
FIG. 7 is a graph showing signals related to an conduction period control section and phase currents for the motor observed when the motor driver of FIG. 1 is in its normal operation.

FIG. 7 is a graph showing signals related to the conduction period control section 100 and phase currents for the motor 10 observed when the motor driver of FIG. 1 is in its normal operation. FIG. 7 shows the periods TW2 and TV1 in FIG. 2 in detail in an enlarged view. In FIG. 7, note that the upward direction on the graph indicates increase of a source current for the U-phase current I1 and the V-phase current I2, and indicates increase of a sink current for the W-phase current I3.

The operation of the motor driver of FIG. 1 will be described with reference to FIGS. 4, 5 and 7. As shown in FIG. 7, the reference pulse PI is a pulse signal having roughly a constant period, and this period serves as the reference of the period of the PWM control.

When a pulse of the position signal PE is input, the period TW2 corresponding to the electrical angle 60° starts and the counter 62 is reset. Assume that at this time the switching stop signal SC output from the switching frequency monitor circuit 60 is "H". The set terminals of the RS flipflops 41 and 42 in FIG. 4 receive the reference pulse PI. With falling of the reference pulse PI, the RS flipflops 41 and 42 are set, and this turns both the control signals F1A and F2 to "H". Since the switching stop signal SC is "H", the control signal F1 is also turned to "H".

The delay circuit 43 delays the control signal F1A by a given amount and outputs the delayed signal to the inverter 44. Since the control signal F1A is "H", the output of the inverter 44 is "L". At this time, the output of the NAND gate 46 is "H" irrespective of the level of the output signal CP2 of the comparator 52, and thus the RS flipflop 42 is not reset.

Assume that the phase switch circuit 23 determines that the current time period is the period TW2 in FIG. 2 based on the position signals S21, S22 and S23. As shown in FIG. 2, the period TW2 is a time period during which the W-phase current I3 is a sink current having a roughly constant magnitude. During the period TW2, in which the W-phase current I3 is the only sink current, the phase switch circuit 23 puts the drive transistor 6 in the continuous ON state. The U-phase and V-phase currents I1 and I2 are source currents and the magnitudes thereof must be changed. Therefore, the phase switch circuit 23 performs switching operation for the drive transistors 1 and 3 according to the control signals F1 and F2. Specifically, during the period TW2, the phase switch circuit 23 puts the drive transistor 1 in the ON state when the control signal F1 is "H", and puts the drive transistor 3 in the ON state when the control signal F2 is "H". The drive transistors 2, 4 and 5 are put in the OFF state.

When both the control signals F1 and F2 are turned to "H", at which the first period T1 starts, the phase switch circuit 23 turns ON the drive transistors 1 and 3. During the first period T1, both the U-phase current I1 and the V-phase current I2 flowing through the U-phase coil 11 and the V-phase coil 12, respectively, flow through the current detection resistance 7 via the W-phase coil 13. A voltage proportional to the magnitude of the current flowing through the current detection resistance 7 is generated at the current detection resistance 7, and the generated voltage is input into the negative input terminals of the comparators 51 and 52 as the motor current detection signal MC.

As the motor current detection signal MC gradually increases and finally reaches the torque instruction voltage TI the comparator 51 changes its output signal CP1 to "L". This resets the RS flipflop 41, and changes its output, that is, the control signal F1A and thus the control signal F1 to "L" (see FIG. 7). The delay circuit 43 delays the control signal F1A by a given amount and outputs the delayed signal to the inverter 44. With "H" as the output of the inverter 44, the RS flipflop 42 is now ready to be reset with the level change of the output signal CP2 of the comparator 52. The counter 62 increments its count value by one.

When the control signal F1 is turned to "L" and the control signal F2 is "H", the period T1 terminates and the second period T2 starts. During the second period T2, the phase switch circuit 23 puts the drive transistor 1 in the OFF state while keeping the drive transistor 3 in the ON state. That is, the drive transistor 1 for the U-phase for which the magnitude of the current should be decreased during the period TW2 is turned OFF prior to the drive transistor 3. This causes flow of a regenerative current to the U-phase coil 11 via the diode 2D and the drive transistor 6. This regenerative current does not flow to the current detection resistance 7, and only the current flowing through the V-phase coil 12 flows through the current detection resistance 7. Thus, detection of the current for the V-phase coil 12 can be made without influence of the current for the U-phase coil 11. The motor current detection signal MC decreases immediately after the drive transistor 1 is turned OFF. Therefore, the comparator 51 outputs a very short pulse as the output signal CP1.

The drive transistors 3 and 6 are kept ON, and thus the current for the V-phase coil 12 continues increasing. The motor current detection signal. MC, which once decreases with no flow of the current for the U-phase coil 11, increases again with increase of the current flowing through the current detection resistance 7. Once the voltage of the motor current detection signal MC reaches the voltage of the signal TS output from the torque signal generation circuit 30, the comparator 52 turns its output signal CP2 to "L". This turns the output of the NAND gate 46 to "L", resets the RS flipflop 42 and thus turns the control signal F2 to "L" (see FIG. 7).

When both the control signals F1 and F2 are turned to "L", the second period T2 terminates and the third period T3 starts. During the third period T3, the phase switch circuit 23 puts the drive transistors 1 and 3 in the OFF state. This causes flow of a regenerative current to the V-phase coil 12 via the diode 4D. Since this regenerative current does not flow to the current detection resistance 7, the voltage of the motor current detection signal MC is zero during the period T3 in which regenerative currents flow through the U-phase coil 11 and the V-phase coil 12.

The period T3 continues until input of the next reference pulse PI, and thereafter the operation performed over the periods T1 to T3 is repeated. The counter 62 increments its count value by one every time the output signal CP1 of the comparator 51 is turned to "L". As is found from the above, the number of times of change of the output signal CP1 of the comparator 51 to "L" is equal to the number of times of switching of the drive transistors 1 and 3 subjected to switching operation.

In the case shown in FIG. 7, at the end of the period TW2, the count value of the counter 62 is "3" and the output CN of the counter 62 is "H". Therefore, at the start of the next period TV1 corresponding to the electrical angle 60°, the switching stop signal SC output from the switching frequency monitor circuit 60 is "H". During the period TV1, therefore, the control signal F1A output from the logic control circuit 40 is given to the phase switch circuit 23 as it is as the switching operation control signal F1, as during the period TW2.

The operations of the motor driver of FIG. 1 during the periods TU1, TV1, TW1, TU2 and TV2 are substantially the same as the operation during the period TW2 except for the following points.

During the period TU1 in which the U-phase current I1 is a source current having roughly a constant magnitude, the phase switch circuit 23 puts the drive transistor 1 in the continuous ON state, and performs switching operation for the drive transistors 4 and 6 according to the control signals F1 and F2. Specifically, the phase switch circuit 23 puts the drive transistor 4 in the ON state when the control signal F1 is "H" and puts the drive transistor 6 in the ON state when the control signal F2 is "H". The drive transistors 2, 3 and 5 are put in the OFF state.

During the period TV1 in which the V-phase current I2 is a source current having roughly a constant magnitude, the phase switch circuit 23 puts the drive transistor 3 in the continuous ON state, and performs switching operation for the drive transistors 6 and 2 according to the control signals F1 and F2. Specifically, the phase switch circuit 23 puts the drive transistor 6 in the ON state when the control signal F1 is "H" and puts the drive transistor 2 in the ON state when the control signal F2 is "H". The drive transistors 1, 4 and 5 are put in the OFF state.

During the period TW1 in which the W-phase current I3 is a source current having roughly a constant magnitude, the phase switch circuit 23 puts the drive transistor 5 in the continuous ON state, and performs switching operation for the drive transistors 2 and 4 according to the control signals F1 and F2. Specifically, the phase switch circuit 23 puts the drive transistor 2 in the ON state when the control signal F1 is "H" and puts the drive transistor 4 in the ON state when the control signal F2 is "H". The drive transistors 1, 3 and 6 are put in the OFF state.

During the period TU2 in which the U-phase current I1 is a sink current having roughly a constant magnitude, the phase switch circuit 23 puts the drive transistor 2 in the continuous ON state, and performs switching operation for the drive transistors 3 and 5 according to the control signals F1 and F2. Specifically, the phase switch circuit 23 puts the drive transistor 3 in the ON state when the control signal F1 is "H" and puts the drive transistor 5 in the ON state when the control signal F2 is "H". The drive transistors 1, 4 and 6 are put in the OFF state.

During the period TV2 in which the V-phase current I2 is a sink current having roughly a constant magnitude, the phase switch circuit 23 puts the drive transistor 4 in the continuous ON state and performs switching operation for the drive transistors 5 and 1 according to the control signals F1 and F2. Specifically, the phase switch circuit 23 puts the drive transistor 5 in the ON state when the control signal F1 is "H" and puts the drive transistor 1 in the ON state when the control signal F2 is "H". The drive transistors 2, 3 and 6 are put in the OFF state.

Figure 8:
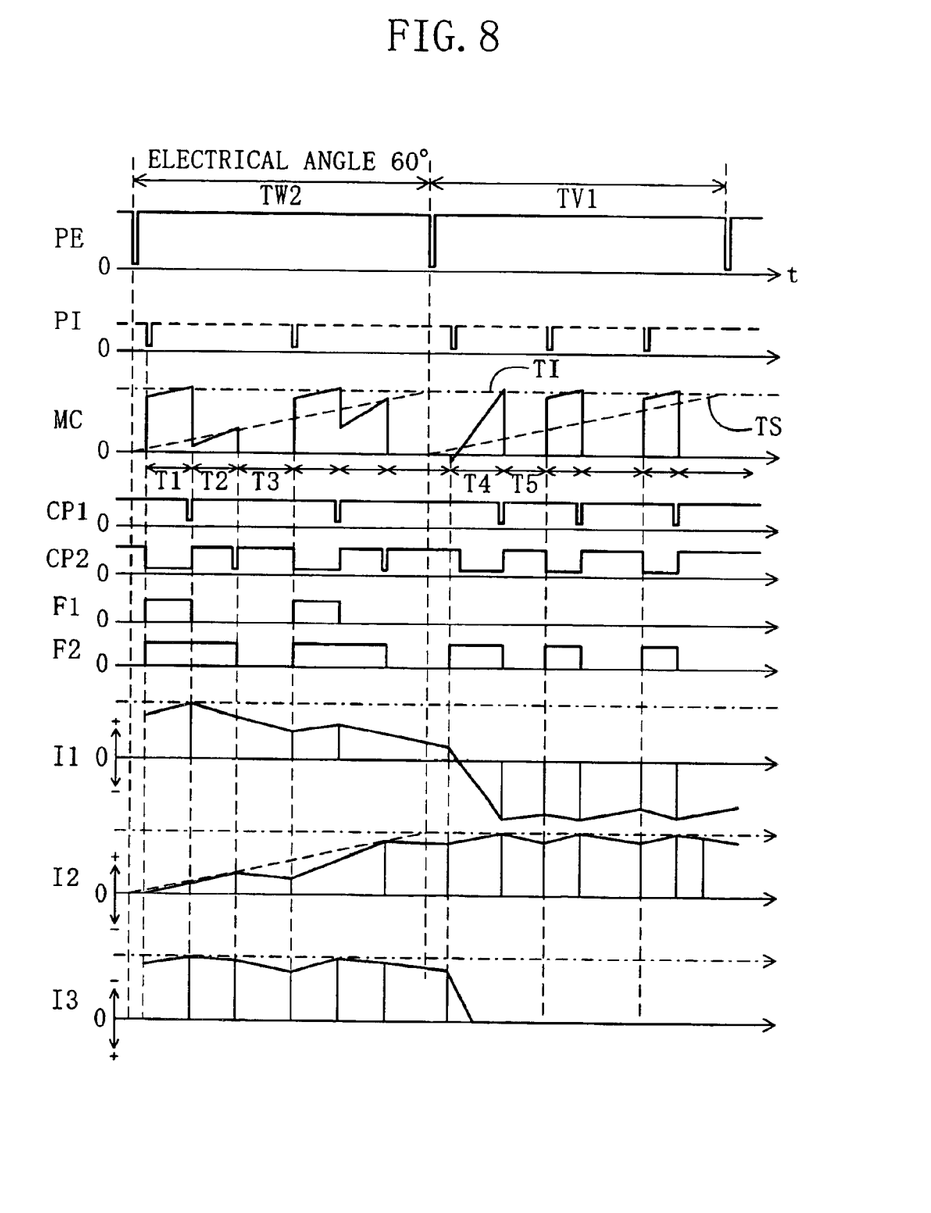
FIG. 8 is a graph showing the signals related to the conduction period control section and the phase currents for the motor observed when the number of times of switching during a time period corresponding to a predetermined electrical angle decreases in the motor driver of FIG. 1.

FIG. 8 is a graph showing signals related to the conduction period control section 100 and phase currents for the motor 10 observed when the number of times of switching decreases during a time period corresponding to a predetermined electrical angle. Decrease in the number of times of switching as shown in FIG. 8 may occur when the load of the motor 10 is so large that a large magnitude of current must flow through a coil and thus it takes time for the current to reach a target value. It may also occur when the rotor of the motor 10 rotates at high speed. As in FIG. 7, FIG. 8 shows the periods TW2 and TV1 in FIG. 2 in detail in an enlarged view.

The operation of the motor driver of FIG. 1 in the case shown in FIG. 8 will be described with reference to FIGS. 5 to 8. The operation in this case is roughly the same as that described above with reference to FIG. 7 for the period TW2, except that the number of times of switching during the period TW2 is small compared with the case in FIG. 7. Also, while the magnitude of the U-phase current I1 gradually decreases during the period TW2, the value fails to reach zero at the time when the first reference pulse PI is input in the period TV1.

In the case of FIG. 8, the number of times of switching for the drive transistors 1 and 3 during the period TW2 (number of times of change of the output signal CP1 of the comparator 51 to "L") is "2". With the count value of the counter 62 of "2" at the start of the period TV1, the switching frequency monitor circuit 60 turns the switching stop signal SC to "L" (corresponding to the period TC3 in FIG. 6). With the switching stop signal SC of "L", the AND gate 56 fixes the switching operation control signal F1 at "L". Receiving the "L" switching operation control signal F1, the phase switch circuit 23 keeps OFF the drive transistor 6 for the W-phase, for which the magnitude of the current should be decreased during the period TV1.

Therefore, the U-phase current I1 and the V-phase current I2 are prevented from flowing through the W-phase coil 13, and this avoids the occurrence as shown in FIG. 12, in which the sum of the U-phase current I1 flowing as a regenerative current and the V-phase current I2 exceeds a predetermined value and these currents together flow through the W-phase drive transistor 6, degrading the drive transistor 6. Also, since the current for the W-phase for which the magnitude of the current should be decreased decreases to zero during the period TV1, the phenomenon of generating brake torque on the motor and degrading the efficiency of the motor can be avoided.

In the period TV1, the drive transistor 2 for the U-phase for which the magnitude of the current should be increased is turned ON. Since this phase is less influenced by an induced voltage than the phase for which the magnitude of the current should be decreased, the phase current increases more easily.

When the load of the motor 10 is small, the time required for the phase current to reach a value corresponding to the torque instruction voltage TI is short. Also, when the rotation of the rotor of the motor 10 is slow, the ratio of the switching period to the time period corresponding to a predetermined electrical angle is small. In both of these cases, the number of times of switching during the above time period increases.

In the period TV1, the drive transistor 2 is put in the ON state during a period T4 and in the OFF state during a period T5 according to the switching operation control signal F2. In the period TV1, the number of times of switching for the drive transistor 2 (number of times of change of the output signal CP1 of the comparator 51 to "L") is "3". With the, count value of the counter 62 reaching "3", the switching frequency monitor circuit 60 turns the switching stop signal SC to "H" (corresponding to the period TC4 in FIG. 6) at the start of the period TU2 following the period TV1. Receiving the "H" signal, the AND gate 56 outputs the switching operation control signal F1A output from the logic control circuit 40 as it is to the phase switch circuit 23 as the switching operation control signal F1.

Therefore, in the period TU2 (see FIG. 2) following the period TV1, the phase switch circuit 23 performs switching operation for the drive transistor 3 for the V-phase for which the magnitude of the current should be decreased, not keeping OFF as done for the drive transistor 6 for the W-phase during the period TV1. In this way, the motor driver of FIG. 1 can resume its normal operation as described above with reference to FIG. 7.

In the embodiment described above, the number of times of switching for a drive transistor was counted during a time period corresponding to one-third of the electrical angle 180°. Alternatively, the counting may be made for a shorter time period such as that corresponding to one-sixth of the electrical angle 180°.

In the embodiment described above, the switching frequency monitor circuit 60 changed the level of its output depending on whether or not the number of times of switching for a drive transistor during a time period corresponding to a predetermined electrical angle had reached three. Alternatively, a larger number of times of switching may be used for the change of the level of the output.

According to the present invention, a switching element such as a drive transistor can be protected from receiving a current exceeding a predetermined value even when the phase of a motor current tends to delay, such as when the load of the motor is large and when the motor rotates at high speed. This prevents degradation of the switching element. In addition, large delay of the phase of a motor current is prevented, and thus the phenomenon of greatly degrading the efficiency of the motor can be avoided. Moreover, with no need of providing a complicated circuit, stable operation of the motor can be realized at low cost.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A motor driver including a plurality of output circuits each having an upper arm side switching element and a lower arm side switching element connected in series, a current being supplied to a motor from a connected point between the upper arm side switching element and the lower arm side switching element of each of the output circuits, the motor driver comprising:

a current detection resistance connected in series with the plurality of output circuits in common for detecting a current supplied to the plurality of output circuits;

a position detection section for outputting a position signal corresponding to the position of a rotor of the motor;

a phase switch circuit for selecting one switching element of one output circuit among the plurality of output circuits according to the position signal and putting the selected switching element in the ON state during a time period corresponding to a predetermined electrical angle, the phase switch circuit also performing switching operation for lower arm side switching elements of plural output circuits among the remainder of the plurality of output circuits when the selected switching element is an upper arm side switching element, or performing switching operation for upper arm side switching elements of plural output circuits among the remainder of the plurality of output circuits when the selected switching element is a lower arm side switching element; and a conduction period control section for generating a switching operation control signal for controlling the switching operation by the phase switch circuit according to an input torque instruction signal and a voltage generated at the current detection resistance so that each of a plurality of time periods obtained by dividing the time period corresponding to the predetermined electrical angle has a first time period in which a plurality of switching elements among the switching elements subjected to the switching operation are put in the ON state and a second time period in which one of the plurality of switching elements put in the ON state during the first time period is kept in the ON state, and outputting the switching operation control signal, wherein the conduction period control section generates the switching operation control signal so that when the number of times of switching operation performed during the time period corresponding to the predetermined electrical angle is equal to or less than a predetermined value, a switching element corresponding to a phase for which the magnitude of a current should be decreased is turned OFF in the time period corresponding to the next predetermined electrical angle.

2. The motor driver of claim 1, wherein the conduction period control section comprises a switching frequency monitor circuit for counting the number of times of switching operation for any of the switching elements subjected to the switching operation and outputting a signal indicating whether or not the counted number of times is equal to or less than a predetermined value.

3. The motor driver of claim 1, wherein the conduction period control section generates the switching operation control signal so that when the number of times of switching operation performed during the time period corresponding to the predetermined electrical angle exceeds the predetermined value again, even a switching element corresponding to a phase for which the magnitude of a current should be decreased is subjected to switching operation during the time period corresponding to the next predetermined electrical angle.

* * * * *